Figure 1:
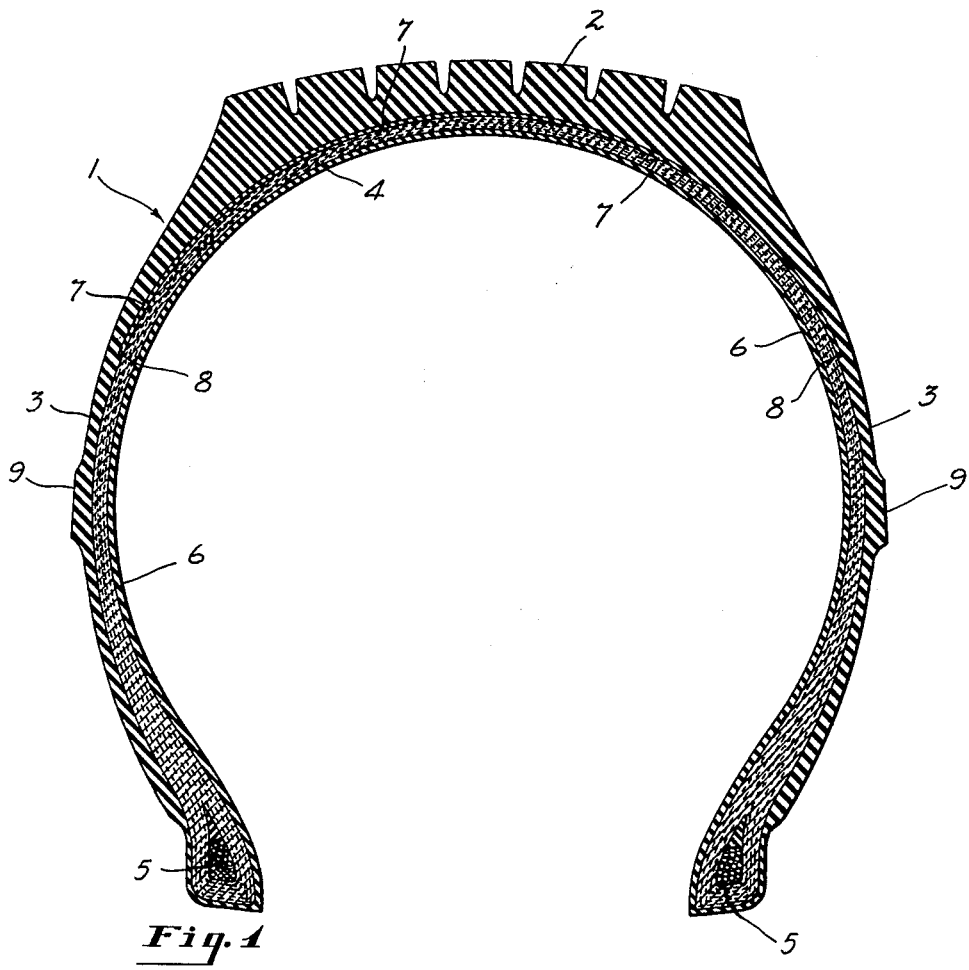

Dec. 14, 1965     C. M. HOFMANN     3,223,134

HIGH SPEED TUBELESS TIRE

Filed Oct. 10, 1961

INVENTOR.
Charles M. Hofmann
BY
McCoy, Greene + te Grotenhuis
ATTORNEYS

3,223,134
HIGH SPEED TUBELESS TIRE
Charles M. Hofmann, Akron, Ohio, assignor to The General Tire & Rubber Company, Akron, Ohio, a corporation of Ohio
Filed Oct. 10, 1961, Ser. No. 144,137
15 Claims. (Cl. 152—330)

The present invention relates to improvements in tubeless tires made of butadiene-styrene (SBR) polymers of high Mooney viscosity and more particularly to a durable inexpensive tubeless tire which is easy to build, which is reliable when operated at extremely high speeds, which has improved resistance to gas permeation, and which has long, useful life.

Heretofore, high quality tubeless tires have employed inner liners of butyl rubber, even though special adhesives were required to adhere such inner liners to a SBR rubber carcass. Since inner liners of butyl rubber are expensive, attempts have been made to provide inner liners made of SBR rubber compositions. The best SBR compositons previously known for use in an inner liner have employed a mixture of natural rubber, SBR reclaim rubber, and high-Mooney SBR rubber. Such compositions had better physical properties (i.e., resistance to gas diffusion, etc.) than other previously known SBR inner liner compositions and were suitable for use in SBR passenger car tires. Such rubber compositions adhered well to conventional SBR carcasses without the necessity for special cements but were otherwise inferior to butyl rubber inner liner compositions.

The inner liner composition of the present invention is intended to replace previously known SBR inner liner compositions and is much better than such known compositions since it has better resistance to permeation by air and to degradation by heat aging. The inner liner composition of this invention permits a reduction of 20 to 25% or more in the thickness of the SBR inner liner of a tire so as to improve the cooling characteristics of the tire and to reduce the cost thereof without reduction in the quality of the tire. It is, therefore, possible to build SBR rubber tires of the highest quality without employing an inner liner of butyl rubber to prevent air loss and without employing special adhesives to hold the liner in place.

Heretofore, considerable research has been carried on with respect to the manufacture of high Mooney SBR rubber tires with substantial amounts of rosin acids as disclosed, for example, in United States Patent No. 2,608,541. Such research was initially promising since laboratory tests seemed to indicate some improvement in tackiness, flex life and abrasion resistance, but later road tests convinced the tire manufacturers that large amounts (i.e., more than 25 phr.) of resins were undesirable.

The present invention provides improved SBR rubber tires but involves compounding procedures contrary to those previously considered to be the most desirable and therefore represents a significant advance in the art of building pneumatic tires. Advances in this art have been very slow due to the fact that laboratory tests have been unreliable and unable to establish reliable criteria leading to substantial improvements in the quality of the rubber. Time and time again road tests have indicated that the laboratory results were misleading and that rubber compositions, thought superior in laboratory tests, where actually inferior. The high quality of present day tires has made it extremely difficult to determine whether a change in compounding procedures provides any improvement and have made any research projects involving road tests extremely involved and expensive. This is one reason that those in the art were unable to discover or recognize the practical advantage of large amounts of coumarone-indene resins in a high-Mooney SBR carcass composition and did not produce the high quality tubeless tires of this invention. The process of this invention seems simple in retrospect, but it is as unobvious as that of United States Patent No. 2,964,083 which also eluded those skilled in the art in spite of the efforts of the oil companies for many years to increase the use of oil in rubber tires.

An object of the present invention is to provide an SBR rubber composition having maximum resistance to gas permeation and suitable for forming the inner liner of a tubeless tire.

A further object of the invention is to provide an inexpensive SBR tubeless tire of high quality having improved ability to maintain adequate inflation pressure at all times and to avoid ply separation.

Another object of the invention is to provide an effective inner liner for a tubeless SBR rubber tire which may readily be adhered to the inner ply of the carcass and which has optimum ability to remain bonded during operation of the tire.

Another object of the present invention is to provide a high quality passenger car tire which is not damaged by heat caused by high ambient temperatures or high speed operation.

A still further object of the invention is to provide a reliable tubeless tire which will not overheat when driven at extremely high speeds.

Another object of the invention is to provide a simple and inexpensive method of building extremely high quality SBR rubber tires which are free of natural rubber.

A further object of the invention is to provide a tubeless tire of high quality which effects maximum savings and obtains maximum physical benefits from the use of high-Mooney butadiene-styrene polymers of the type disclosed in United States Patent No. 2,964,083.

Other objects, uses and advantages of this invention will become apparent to those skilled in the art from the following description and claims and from the drawings.

Figure 2:
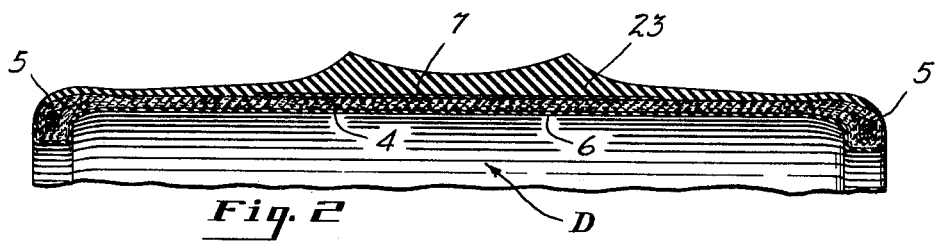

In the drawings FIGURE 1 is a cross-sectional view on a reduced scale showing a tubeless tire constructed according to the present invention, and FIGURE 2 is a fragmentary cross-sectional view showing the uncured tire as it is built on a conventional tire building drum.

The tire 1 shown in the drawing has a conventional toric shape and comprises a relatively thick abrasion-resistant tread 2, side walls 3, a multiple-ply fabric reinforced carcass 4 having four plies whose end portions are wrapped around the wire bead rings 5, and an inner liner 6 covering the entire inner surface of the tire between the bead rings 5 to prevent leakage of air from the tire. The tubeless tire also has a cushion layer 7 between the tread 2 and the rubberized fabric of the carcass with side edges 8 of said layer located at the side walls 3. Conventional circumferential protecting ribs 9 may be provided on the side walls to protect the tire against damage due to rubbing against curbs. When a white side wall is provided, it extends from the rib 9 toward the bead 5 in the conventional manner.

The inner liner 6 is preferably formed from a homogeneous uncured sheet having a uniform thickness no greater than 0.1 inch, and the average thickness of the cured liner 6 is about .03 to .08 inch and preferably .04 to .06 inch, the latter thickness preferably being substantially uniform particularly in the portion of the tire radially outwardly of the ribs 9.

The cushion layer 7 is also formed of a sheet of uncured rubber of uniform thickness which, after molding, is reduced in thickness at the side edges 8, and the cured layer 7 has an average thickness of .005 to .03 inch and preferably 0.01 to 0.025 inch. Excellent results can be obtained where the inner liner 6 has a thickness of .04 to .05 inch and the cushion layer 7 has a thickness of .01 to .02 inch, but it will be apparent that such thicknesses may vary considerably. The inner liner 6 and the cushion layer 7 are preferably homogeneous and free of fabric or cord reinforcement.

Each ply of the carcass 4 may employ a separate rubber composition, but it is preferable to employ the same carcass composition throughout the carcass. The fabric reinforcement of the tire may be of any suitable type such as weak-weft rayon or nylon tire cord fabric, and conventional cord adhesives may be employed to improve bonding between the fabric and the carcas rubber applied thereto. Adhesives may also be employed to improve adhesion of various parts of the tire and to splice the ends of the tread together. The preferred method of making tires according to this invention is to avoid the use of adhesives between the inner liner and the rubberized fabric, between plies of the carcass, and between the fabric and the cushion layer 7 so as to simplify the tire building operaton and make it more reliable and to reduce the cost of the tire.

It will be understood that the tubeless tire 1 shown herein is an integral vulcanized tire and that each layer is integrally joined throughout its length and width to the adjacent layer. The tire may be built on a conventional machine of the general type shown in United States Patents 2,614,952; 2,838,091; and 2,838,092, using the well-known flat-band process.

The expansion of the uncured tire from the generally cylindrical shape, which it has on the itre building drum D as shown in FIGURE 2, to the toric shape which it has in the curing mold tends to cause separation of the various layers. Prior to this invention, it was thought that natural rubber was essential to provide proper tackiness when building high quality tires by such "flat-band" method and to provide a cured tire which would not be subject to tread or ply separation (unless special adhesives were used), but it has been found that tires made by the flat-band process using the carcass composition of the present invention may be built just as easily as those tires which previously employed natural rubber compositions without defects due to improper bonding.

Tackifying resins are commonly used to improve the tack of natural rubber compositions since a small amount of such resins greatly improves the building tack, but such tackifying resins are not used extensively with ordinary SBR rubber compositions since they have little effect on the building tack. As pointed out in the book "Synthetic Rubber" by G. S. Whitby (copyright 1954 by John Wiley & Sons, Inc.), Koresin is one of the most effective tackifying resins, but the extra building tack which it confers on standard GR-S rubber is only moderate when used in amounts that do not severely harm the physical properties of the rubber. As indicated in this book, most success in obtaining adequate tack is achieved by replacing part of the SBR rubber with natural rubber. This technique has been adopted by the industry in the building of oil-extended rubber tires, both the tread and carcass compositions of present day tires containing large amounts of natural rubber.

Pneumatic rubber tires are subjected to very severe operating conditions, and products of the highest quality are the only ones practical for commercial production. This is particularly true because of the high speeds which are so common on modern turnpikes. Although it has been recognized that great savings can be affected by the use of high-Mooney oil-extended rubber (due to the low cost of oil as compared to rubber), nevertheless tire companies have been cautious and slow in reducing the amount of natural and low Mooney SBR rubber employed because of the difficulty in mass-producing safe high qualtiy tires having superior adhesion between plies and between the carcass and the tread.

At the present time substantial amounts of natural rubber are employed in carcass compositions to obtain the necessary building tack without serious reduction in the physical properties of the rubber, those skilled in the art believing, prior to this invention, that such compounding technique provided the most practical and highest quality tire. It was known that the amount of natural rubber employed could be reduced by use of special adhesives to provide the essential building tack, but tire manufacturers used large amounts of natural rubber instead due to the inconvenience and extra expense involved in the use of such special adhesives.

Heretofore, considerable research work has been done with respect to substitution of rosin derivatives for oil as an extender for high Mooney rubber. Such work was sponsored by the Office of Synthetic Rubber of the Reconstruction Finance Corporation as part of the Government synthetic rubber program. Considerable research was carried on using disproportionated rosin as an extender for SBR rubbers of varying Mooney viscosities, and the laboratory work initially led some people to believe that high quality tires might be built from rosin-extended high Mooney rubber, but tire tests seemed to indicate that pneumatic tires made from rosin-extended rubber were inferior to other oil-extended rubber tires. Work with rosin extenders was, therefore, abandoned.

It has been recognized for more than a decade in the tire industry, since the development of oil-extended SBR rubber, that the highest quality rubber for use in tire treads is obtained when a very high Mooney SBR rubber is employed that is softened with oil rather than by other more degrading treatments. It was also known that the overall cost of a tire would be reduced as the Mooney viscosity of the rubber polymer was increased and the amount of inexpensive softener employed to soften such rubber was increased. All of the tire companies have been spending considerable amounts of money trying to develop high quality tubeless pneumatic tires containing large amounts of high-Mooney rubber and large amounts of softeners. The industry had concluded, prior to this invention, that the best tires should include substantial amounts of natural rubber, particularly in the tire carcass, so that there is no danger of tread or ply separation when tires are built in the usual way.

It has been understood for more than a decade, since the introduction of tubeless tires, that an ideal tubeless tire should have the ability to hold air for an indefinite period of time, the ability to stand up when operated at high temperatures or at high speeds for long periods of time, and the ability to avoid overheating when operating at high speeds. Although it was the object of research programs to develop a tubeless tire having such capabilities, tire manufactureres did not recognize that such a high quality tubeless tire could be made using carcass compositions containing high-Mooney SBR rubber and large amounts of coumarone-indene resins or the like.

The present invention involves the discovery that the quality of a tubeless tire made from oil-extended SBR rubber is improved when the inner liner, the ply stock, and the cushion layer between the carcass and the tread is made of substantially the same SBR rubber composition which is substantially free of natural rubber. It has been discovered that resistance of the carcass to diffusion of gases is greatly improved by constructing the tire in this manner, that excellent adhesion is obtained between the plies and the other layers and that the tire has an exceptionally good quality when the rubber composition for the entire carcass contains large amounts of certain tackifying resins, such as paracoumarone-indene resins. Although those skilled in the art were convinced, prior to this invention, that resin-extended rubbers had inferior physical properties, it has been discovered that the method of this invention produces an extremely high quality tire having greatly improved ability to stand up during high speed operation (i.e., speeds greater than 75 miles per hour) without tread or ply separation and without the deterioration which is characteristic of tires containing substantial amounts of natural rubber. The tire of the present invention has improved resistance to cracking and degradation due to heat, flexing, and contact with oxygen and/or ozone as well as improved resistance to gas diffusion and is also easier to manufacture than previously known tires. It is, therefore, superior to previously known SBR oil-extended rubber tires.

The carcass composition of the present invention comprises 30 to 60% by weight of rubber hydrocarbons, 20 to 35% tackifying resins and oily plasticizers, 20 to 30% carbon black, or other reinforcing filler, and preferably no more than 5 to 10% of other compounding ingredients, such as sulfur, accelerators, antioxidants, stearic acid, zinc oxide, or the like, at least 80% of the rubber hydrocarbons preferably being a copolymer of 70 to 90% by weight of butadiene and 30 to 10% of styrene, which copolymer is polymerized at a temperature below 10° C. At least 60% by weight of the rubber hydrocarbons of said carcass composition are preferably rubbery synthetic hydrocarbon polymerization products of a conjugated diolefinic compound, such as butadiene or isoprene, having 4 to 5 carbon atoms which polymerization product has a raw Mooney viscosity of about 120 to 180. The carcass composition preferably contains 30 to 50% of such high-Mooney polymerization product (i.e., SBR–1712 polymer), 0 to 10% natural rubber, and 0 to 10% of SBR polymers derived from reclaim rubber.

The amount of coumarone-indene resins and other tackifying resins in the carcass composition is 15 to 30% of the weight of said composition, and the amount of hydrocarbon minearl oil or other oily plasticizer is preferably about 4 to 15% by weight and less than one-half the amount by weight of said tackifying resins. Best results are obtained using 10 to 30% by weight of coumarone-indene resins having a melting point of 50° to 110° C. The amount of reinforcing filler is preferably about 35 to 60% of the total amount of resinous tackifiers and rubber hydrocarbons, and such filler includes a major portion of carbon black and preferably a major portion of fine reinforcing carbon black. Best results are obtained when substantially all of the reinforcing filler is carbon black and a major portion of such black is a fine reinforcing carbon black, such as high abrasion furnace (HAF) carbon black. The amount of carbon black may be increased when less of the black is HAF black and more of the black is MAF or SRF black. An increase in the amount of carbon black may also permit a slight increase in the amount of plasticizer and/or tackifier. The amount of plasticizer is preferably selected to provide the carcass composition with a raw Mooney viscosity of 30 to 50 prior to calendering, and the tackifying resins are selected so as to provide a carcass composition which has adequate "green strength" and building tack but does not stick to the metal of the calender rolls.

The carcass composition of this invention contains 100 parts by weight of a butadiene-styrene polymerization product having a raw Mooney viscosity of M, where M is about 120 to 180, and Y parts of tackifying resins, such as coumarone-indene resins, which are compatible with said polymerization product, Y being at least 40 and preferably no less than $(M/3-5)$ and no more than $(M/2-10)$. The amount of coumarone-indene resins or other tackifying resins is usually at least $M/3$ parts per 100 parts of said polymerization product. Best results are obtained using 40 to 70 parts of tackifying resins having a melting point of 50° to 110° C. per 100 parts of rubber hydrocarbons and using resins consisting predominantly of coumarone-indene resins. The tackifying resins used are soluble in benzene and preferably have a melting point of about 60° to 100° C. The preferred resins are oil-soluble or soluble in aliphatic solvents such as naptha or gasoline. In the best carcass compositions, at least three-fourths of the tackifying resins are soluble in the plasticizing oil employed in such carcass composition.

The amount of carbon black added to the 100 parts of high Mooney butadiene-styrene polymer and Y parts of tackifying resins is $0.3(100+Y)$ to $0.6(100+Y)$ and is usually 40 to 100 parts. Such amount is preferably $0.35(100+Y)$ to $0.5(100+Y)$, particularly when the Mooney viscosity M of the polymer is less than 160.

The amount of plasticizing oil or other compatible oily softener added to the carcass composition per 100 parts of high Mooney SBR polymers is sufficient to reduce the raw Mooney viscosity of the composition to 30 to 60 and preferably 30 to 50 and is usually less than $Y/2$, particularly when M is less than 150. The amount of oil per 100 parts by weight of the high Mooney SBR polymer is at least 10 and no more than $(Y/2+5)$, when M is at least 120, and may be 30 or 40 parts if M is very high.

Excellent results are obtained when such amount of oil includes 3 to 10 parts of pine oil or other solvent-type oil. For example, 25 to 40% by weight of the oily plasticizers may be solvent-type oils which readily dissolve the tackifying resins of the composition. Superior results are obtained when 90% or more of the tackifying resins used in the carcass composition are soluble in the plasticizing oils of said composition.

A minor portion of the rubber hydrocarbons of the carcass composition of this invention may be provided by low-Mooney SBR polymers, natural rubber, or reclaim rubber. The amount of natural rubber should be no more than 15 parts and is preferably less than 5 parts, and the amount of reclaim rubber should be no more than 30 parts per 100 parts by weight of the high-Mooney SBR polymer. Up to 40 parts parts of 100% SBR whole tire reclaim rubber may be employed per 100 parts of rubber hydrocarbons, but it is preferable to employ no more than 10 parts of reclaim rubber per 100 parts of the high-Mooney SBR polymer in a high quality tire.

As much as 20 or 30 parts of low-Mooney SBR polymers (i.e., having a Mooney viscosity of 40 to 80) may be employed per 100 parts by weight of the high-Mooney SBR polymer, but it is preferable to employ no more than 10 or 15 parts of such low-Mooney polymers, best results being obtained with less than 5 parts. The amount of tackifying resins should be increased as the amount of SBR polymers is increased. It is desirable, for example, to add 5 or 10 more parts of tackifying resins if 20 or 30 parts of 50- or 60-Mooney SBR polymer is added per 100 parts by weight of the high-Mooney polymer of the carcass compositions described above. The minimum amount of tackifying resins is usually at least 40 parts per 100 parts of rubber hydrocarbons.

In addition to the 100 parts of high-Mooney SBR polymer, the other rubber hydrocarbons (if any), the tackifying resins, the oily softeners, and the carbon black, the carcass composition of this invention preferably contains up to 30 and preferably no more than 15 or 20 parts by weight of other compounding ingredients such as zinc oxide, stearic acid, antioxidants, vulcanizing agents, accelerators, etc. The preferred compositions contain, per 100 parts by weight of rubber hydrocarbons, 2 to 8 parts of zinc oxide, 0.5 to 3 parts of stearic acid, 0.5 to 2 parts of an antioxidant, 1.5 to 3 parts of sulfur, and 0.5 to 3 parts of an accelerator. The amount of plasticizing oils is preferably selected to provide the carcass composition of this invention with a raw Mooney viscosity of about 30 to 45 after all of the ingredients including the carbon black and the curing agents have been added.

The carcass compositions described above are also suitable for forming the cushion layer of the tubeless tire of this invention. The amount of plasticizing oils may be selected to provide the cushion layer composition with a raw Mooney viscosity as low as 25 or as high as 65, but it is preferable to provide such composition with a raw Mooney viscosity of about 30 to 55. Up to 20 or 25 parts of natural rubber may be employed in the cushion layer composition per 100 parts by weight of the high-Mooney polymer, but no particular advantage is obtained by such expedient.

The carcass compositions described above may be employed to form the inner liner of the tubeless tire of this invention as shown in the drawings, but it is preferable to employ slightly different amounts of the various ingredients. The inner liner composition usually comprises 30 to 60% by weight of rubber hydrocarbons, 20 to 35% of tackifying resins and oily plasticizers, 20 to 30% of carbon black and preferably no more than 5 to 10% of other compounding ingredients, like the carcass compositions described above. The inner liner composition may contain 8 to 30% tackifying resins of the type described above and preferably contains no more than 5% natural rubber and no more than 20% reclaim rubber. The amount of process oil or other oily plasticizer is preferably less than one-half the amount of tackifying resin, where the average Mooney viscosity of the high Mooney polymers is less than 160. The amount of oil may be less than the amount employed in the carcass composition and is usually 5 to $(Y/2+5)$ parts per 100 parts of the high Mooney SBR polymers. The amounts of tackifying resins are preferably 30 to 70 parts by weight per 100 parts of rubber hydrocarbons although advantages of the invention may be obtained using only 25 parts of such resins in the inner liner composition. The amounts of plasticizing oils are usually at least 5 parts per 100 parts of rubber hydrocarbons and are selected to provide the inner liner composition with a raw Mooney viscosity of 30 to 70 and preferably 35 to 50. An inner liner composition preferably contains 100 parts by weight of a butadiene-styrene polymer polymerized at a temperature below 10° C. and having a raw Mooney viscosity M of about 120 to 180, no more than 10 parts of natural rubber, no more than 30 parts of reclaim rubber (i.e., 100% SBR whole tire reclaim), no more than 10 to 15 parts of low-Mooney (i.e., 40 to 80 Mooney) SBR rubber polymers, Y parts of tackifying resins, such as coumarone-indene resins, which are compatible with the high-Mooney polymer, where Y is between $(M/3-10)$ and $(M/2-10)$, and $0.3(100+Y)$ to $0.6(100+Y)$ parts of carbon black (preferably 50 to 100 parts of reinforcing furnace carbon black).

The tackifying resins used in the rubber compositions of this invention are preferably soluble in or compatible with the butadiene-styrene copolymer or other rubbery polymer, or, in other words, a resin which is capable of being milled into the polymer to form a rubber composition which is homogeneous when vulcanized to the elastic state. A resinous material which bleeds out of the rubber or normally forms a heterogeneous material upon vulcanization is incompatible with the rubber polymer and, therefore, undesirable.

The preferred tackifying resins are coumarone polymers, indene polymers or coumarone-indene polymers having a melting point of 60° to 100° C. Best results are obtained using common coumarone-indene resins prepared from coal-tar distillates. The coumarones and indenes obtained from such distillates may be polymerized to produce resins consisting of coumarone polymers, indene polymers and unsaturated fatty acids from coal tar, rosin or the like. A mixture of a major portion of indene and a minor portion of coumarone may, for example, be polymerized by employing suitable materials such as sulfuric acid resinifying agents. The resulting paracoumarone-indene resins are soluble in most organic solvents and are compatible with butadiene-styrene polymers.

The tire of the present invention has a tread which is preferably formed of a tread composition comprising 30 to 60% by weight of rubber hydrocarbons, 15 to 35% by weight of tackifying resins and oily plasticizers, 20 to 35% by weight of carbon black or other reinforcing filler, and preferably no more than 5 to 10% of other compounding ingredients including sulfur, an accelerator, an antioxidant and other conventional materials such as stearic acid, zinc oxide or the like. At least 70% of the rubber hydrocarbons are preferably rubbery synthetic hydrocarbon polymerization products of a conjugated diolefinic compound, such as butadiene or isoprene, having 4 to 6 carbon atoms which products are polymerized at a temperature below 10° C. (i.e., 5° C.), such as a copolymer of 60 to 90% butadiene and 40 to 10% styrene. At least one-half of the rubber hydrocarbons of said tread composition is preferably such a butadiene-styrene copolymer having a raw Mooney viscosity of about 110 to 200. Preferably less than one-fourth of such rubber hydrocarbons are natural rubber.

The tread composition preferably contains 30 to 50% of such high-Mooney butadiene-styrene cold rubber (i.e., SBR 1712 polymer or the like), 0 to 20% by weight of natural rubber, and 0 to 15% by weight of polymers derived from reclaim rubber (i.e., the same type of SBR tread rubber). The total amount of oily plasticizers and resinous tackifier in the tread composition is about 15 to 35% by weight; and, if any tackifying resin employed, the amount thereof should be less than 10 parts and preferably less than 5 parts per 100 parts of rubber hydrocarbons so as to provide a tread which is not subject to excessive cracking. Usually more than 90% of the resins of a tire of this invention are provided in the carcass rather than the tread or sidewalls. The amount of oily plasticizers in the tread composition is at least two and preferably at least three times the amount of tackifying resins, and the amount of reinforcing filler is preferably about 30 to 70% of the total amount of plasticizers, tackifiers and rubber hydrocarbons. Substantially all of the reinforcing filler is preferably carbon black, and a major portion thereof is preferably HAF or ISAF black having a surface area of at least 70 square meters per gram so as to provide the tread with a high abrasion resistance. The amount of hydrocarbon mineral oils or other oily plasticizers is preferably 10 to 30% by weight of the tread composition and is such as to provide the tread composition with a raw Mooney viscosity of about 40 to 80 (preferably 50 to 70) prior to calendering or extrusion after it is mixed in the Banbury mixer.

The tread composition preferably contains 100 parts by weight of the high-Mooney SBR polymer, X parts of the plasticizing oil or other oily plasticizer, less than 10 parts of tackifying resins (preferably none), less than 30 parts of natural rubber (i.e., less than 5 parts), $0.3(100+X)$ to $0.7(100+X)$ parts of a reinforcing carbon black (such as HAF), and less than 30 parts of other compounding ingredients, X being at least 20 and usually $M/4$ to 60, where M is the Mooney viscosity of said polymer.

The SBR polymer of the tread is preferably the same as the SBR polymer of the carcass, but satisfactory adhesion can be obtained when the tread is formed of a low-Mooney SBR rubber composition.

The present invention is mainly concerned with high-Mooney copolymers of butadiene and styrene, but advantages of the present invention may also be obtained using other high-Mooney hydrocarbon rubbers, such as polymers of conjugated diolefinic compounds having 4 to 6 and preferably 4 to 5 carbon atoms (such as butadiene or isoprene).

The present invention is particularly concerned with rubber compositions made from polymers having a raw Mooney viscosity of at least 100, and the carcass compositions of the present invention preferably contain a substantial amount of butadiene-styrene (SBR) copolymers having a Mooney viscosity of about 120 to 180.

The high-Mooney polymers used in the tires of this invention are preferably copolymers of a major portion of butadiene and a minor portion of styrene, such as copolymers of 60 to 90% by weight butadiene and 40 to 10% styrene. The preferred polymers are copolymers of about 70 to 80% butadiene and 30 to 20% styrene which are polymerized at a temperature below 10° C. (i.e., around 5° C.). Such SBR copolymers are preferred for the tread compositions, the carcass compositions, the cushion layer compositions and the inner liner compositions, but it will be understood that minor amounts of natural rubber (Hevea) or SBR reclaim rubber may also be employed in any of the compositions although this reduces the quality of the tire.

The tread compositions of the tire of this invention are conventional and may be of the type described in United States Patent No. 2,964,083. Such oil-extended rubber tread compositions may employ various oily softeners including various asphaltic products and materials other than hydrocarbon mineral oils, but it is preferable to employ conventional oils such as Circosol 2XH or the like.

The carcass compositions of the present invention preferably employ processing oils consisting predominantly of naphthenic and paraffinic oils, best results being obtained with oils consisting essentially of 90% naphthenic and paraffinic oils and up to 10% aromatic oils. Since oil mixtures containing larger percentages of aromatic oils are less expensive, it is practical to employ oils containing up to 25% aromatic oils, such as Circosol 2XH. Minor amounts of other less expensive oils such as Philrich 5 containing a major portion of aromatic oils may also be used, although they are less desirable. Satisfactory tires for use in warm climates can be made when the major portion of the softener is an oil such as Sundex 53.

The oils used in the carcass compositions of the present invention and in the cushion layer compositions and the inner liner compositions preferably have a Saybolt Universal viscosity of 30 to 100 seconds at 210° F. and a Saybolt Universal viscosity of at least 100 seconds at 100° F. An oil, such as Circo Light Oil or Circo Light Process Aid made by Sun Oil Company, provides an excellent softener for the rubber compositions of this invention. Excellent results are also obtained using Circosol 2XH, Circosol NS, and various other hydrocarbon mineral oils. The preferred oils are petroleum oils having strong solvent power, high boiling point and low vapor pressure.

Circosol 2XH is a light green viscous hydrocarbon liquid having a specific gravity of about 0.95, a Saybolt viscosity at 100° F. of about 200 seconds and at 210° F. of about 83 seconds. Such liquid contains about 20% aromatic oils, about 39% naphthenic oils and about 41% paraffinic oils and has a pour point of about 10° F., a flash point of about 430° F., and an aniline point of about 174° F.

Philrich 5 is a well known extender and plasticizer made by Phillips Chemical Co. and is a liquid containing about 41% aromatic oils, about 20% naphthenic oils and about 39% paraffinic oils. It is a blend of extract oils produced during solvent extraction of lubricating oils.

Diamond Process Oil is a low pour point oil which is largely paraffinic and has a specific gravity of 0.883, a flash point of 360° F., a Saybolt viscosity at 100° F. of 100 and at 210° F. of 39, and a pour point of about 15 to 20° F.

Circo Light oil is a petroleum distillate having a pour point below 0° F., a flash point of about 325° F. and an aniline point of about 157° F. Such oil is more volatile than Circosol 2XH and contains a slightly lower percentage of aromatic hydrocarbons.

The tackifying resins used in the rubber compositions of the present invention are preferably coumarone-indene resins having a melting point of 60° to 110° C. Suitable resins for this invention include "Picco 100," a coumarone-indene resin made by Pennsylvania Industrial Chemical Company having a melting point of about 100° C. and a specific gravity of about 1.15. Picco 100 is a non-toxic solid at room temperature and is about 1.5 to 3 on the coal-tar resin scale.

The resinous tackifiers employed in the rubber compositions of this invention may include minor amounts of tackifying resins other than coumarone-indene resins, such as wood rosin, hydrogenated rosins or rosin derivatives such as "Butac" or "Staybelite Ester 10." Preferably less than 30% of the tackifying resins employed in the rubber composition of this invention are resins such as "Butac," "Koresin" or oil-soluble phenolic resins, but it will be understood that substantial amounts of such resins may be employed.

"Staybelite Ester 10" is a glycerin ester of hydrogenated rosin having a melting point of about 80° to 85° C., a specific gravity of about 1.07, a flash point of 280° C., and a maximum acid number of about 10. Such resin is odorless, hard, brittle and amber-colored and is made by Hercules Powder Co.

"Staybelite Resin" is hydrogenated rosin made by Hercules Powder Co., Inc. having a drop softening point of about 75° C., a specific gravity at 20° C. of about 1.046, an acid number of about 164, and a saponification number of about 167. Such resin is a brittle solid with a very pale color.

"Butac" is a blend of resin acids and amine-resin soaps made by Huber Corp. having a specific gravity of about 1.075 to 1.085 and a softening point (Ring & Ball) of about 145 to 155° F. Such resin is an abietic acid salt of triethanolamine. Various other abietic acid salts of ethanolamines disclosed in U.S. Patent No. 2,457,335 may also be employed in the method of this invention.

Tackifying resins are those resins which have the ability of imparting substantial tack to SBR rubber compositions and which are of the type used for such purpose in rubber compounding as contrasted with higher molecular weight resins which have a reinforcing effect and are not used primarily for the purpose of tackifying.

A minor portion of the resins employed in the rubber compositions of this invention may be phenolic resins which are soluble in benzene and which have a melting point above 60° C. The phenolic resins which may be used are reaction products of simple phenol, a substituted phenol, or mixtures thereof and formaldehyde, acetylene or similar reactive material. The resins should be soluble in or compatible with the butadiene-styrene rubber polymer of the rubber composition and are preferably soluble in hydrocarbon mineral oils. Novolak resins are prepared by reacting simple phenol with formaldehyde to produce suitable tackifying resins, particularly when such resins are modified with styrene, the esterificaiton products of glycerol and natural rosin (ester gum) or various other modifying agents used in synthetic resin manufacture to produce a resin having the desired solubility and compatibility with the butadiene-styrene polymer.

Part or all of the simple phenol reacted with the formaldehyde or acetaldehyde to produce the resin may be replaced with phenols which are substituted in the ortho or para position with an aryl or alkyl group having three or more carbon atoms or substituted in one or both of the meta positions with long chain aliphatic groups having 5 to 20 carbon atoms (such as Cardanol). Such substituted phenols are open in at least two of the ortho and para positions and consist only of carbon, oxygen and hydrogen atoms. The preferred substituted phenols are substituted in only one of the ortho and para positions with an aryl or alkyl group having three to ten carbon atoms such as o-tertiary (butylphenol, p-phenyl phenol, p-octophenol, o-tertiary amylphenol or the like.

Such substituted phenols may also be reacted with acetylene to produce tackifying resins such as Koresin or the like.

The tackifying resins suitable for the rubber composition of this invention are normally insoluble in water and are soluble in benzene. Such resins preferably have a melting point of 60 to 100° C. and are preferably soluble in solvent type oils, such as pine oil. The phenolic resins should not be highly cross linked but should be of a type which are curable in the presence of an external chemical such as hexamethylene tetramine. The various so-called "oil soluble" phenolic resins employed as tackifiers in rubber compounding are suitable for use in minor amounts in the rubber compositions of this invention. It is preferred, however, to use only small amounts of resins such as Koresin or Butac and to avoid use of resins which cause the finished rubber composition to stick to the metal rolls and thereby make calendering difficult.

Various phenolic resins are suitable including Durez 13349, SP–1047, Synvar RC 16H, Koresin or the like.

Durez 13349 is an oil-modified phenol-formaldehyde thermoplastic resin made by Durez Plastics Division of Hooker Chemical Corp. and having a melting point of about 80° to 85° C. Such resin is the same as Durez 13355 except that it does not contain hexamethylene tetramine.

SP–1047 is an alkyl phenolic thermoplastic resin of the Novolak type having a ball and ring melting point of about 90 to 110° C. made by Schenectady Varnish Company, Inc., of Schenectady, New York.

Koresin is a reaction product of p-tertiary butyl phenol and acetylene having a melting point of about 110° to 130° C.

Best results are obtained when a major portion (preferably at least three-fourths) of the tackifying resins of the rubber compositions of this invention are soluble in the plasticizing oil used in the rubber composition. It is desirable to employ at least 5 parts of a solvent-type oil, such as Pine oil, per 100 parts of rubber hydrocarbons to assist in dissolving the resins, but this is not essential. The tackifying resins and the plasticizing oils should be compatible with the butadiene-styrene polymers of the rubber composition, and the tackifying resins are preferably compatible with the plasticizing oils.

The tackifying resins are selected to provide a rubber composition which will permit building of a tire by the "flat-band" process as shown in FIG. 2 without the use of carcass cements. Such resins must provide an uncured composition having building tack and substantial tensile strength ("green strength") so as to permit expanding of the uncured tire from the shape shown in FIG. 2 to a toric shape as shown in FIG. 1. Building tack should not be confused with stickiness which is undesirable as is any tendency of the rubber composition to stick to metal rolls of a calender. Tackifying resins with a melting point less than 50° C. are often undesirable because they do not provide the desired building tack and "green strength."

The rubber compositions of the tire of this invention may employ conventional reinforcing materials such as carbon black in amounts normally used in tread or carcass compositions. The tread compositions preferably contain carbon black as the reinforcing material, and a major portion of such carbon black is preferably a fine highly reinforcing carbon black such as Philblack-O, Philblack-A, Spheron 9 or the like as is well understood in the art. The carcass compositions, the cushion layer compositions and the inner liner compositions of the present invention also employ reinforcing materials such as carbon black, and 90% of the reinforcing material is preferably easy processing channel (EPC) black, fine furnace (FF) carbon black, fast extrusion furnace (FEF) carbon black, high abrasion furnace (HAF) carbon black or similar oil furnace or gas furnace carbon black having a surface area not less than 30 square meters per gram, although advantages of the invention may be obtained using minor amounts of other channel blacks or poor reinforcing blacks such as semi-reinforcing furnace (SRF) carbon blacks. All of the reinforcing material may be a fine highly reinforcing furnace carbon black, such as a high abrasion furnace (HAF) carbon black or a medium abrasion (MAF) black. An easy processing channel (EPC) carbon black may also be used.

All of the reinforcing material may be HAF black, but it is preferable to employ a blend of 40 to 60% HAF black and 60 to 40% of a coarser black, such as MAF or FEF carbon black. Excellent results are obtained where the average surface area of all the carbon black is in the range of 40 to 100 square meters per gram. A blend of two oil furnace carbon blacks having surface area of 30 to 50 square meters per gram and 70 to 90 square meters per gram respectively provides excellent reinforcing material, but it will be apparent that the types of carbon black employed in the carcass composition may vary considerably without departing from the spirit of the invention. Suitable HAF carbon blacks for use in the carcass compositions of this invention include Continex HAF, Kosmos 60, Statex R, Philblack-O, and Vulcan 3. Philblack-O is an oil furnace carbon black having about 70 to 80 square meters per gram surface area.

Suitable MAF or FEF carbon blacks for the rubber compositions of this invention include Kosmos 50, Philblack-A, Statex M and Sterling SO. Philblack-A is an FEF oil furnace carbon black having a surface area of about 35 to 45 square meters per gram.

Excellent results may be obtained using blends of different fine reinforcing carbon blacks such as HAF blacks and FEF or HMF blacks since high abrasion resistance is not required, but only small amounts of non-reinforcing blacks such as SRF may be employed since a high degree of reinforcement is necessary. It is preferable to employ fine reinforcing furnace carbon blacks which will provide the cured carcass composition of this invention with a tensile strength of at least 2000 pounds per square inch (i.e., 2400 to 3000 p.s.i.). Some advantages of the invention may be obtained with carcass compositions having lower tensile strengths (i.e., 1600 to 1900 p.s.i.) but tire compositions having a tensile strength less than 1600 pounds per square inch are not suitable and those having a tensile strength less than 1900 pounds per square inch are inferior. It is, therefore, necessary to employ large amounts of high reinforcing carbon blacks such as easy processing channel (EPC) carbon blacks, MAF blacks, HAF blacks, HMF blacks or the like.

The rubber compositions of this invention include conventional compounding ingredients such as zinc oxide, stearic acid, various antioxidants, accelerators and sulfur and/or other curing agents.

Suitable antioxidants for use in the rubber compositions of this invention include triphenyl phosphite, trisnonylphenyl-phosphite-type compounds such as Polygard or other alkylated aryl phosphites and various other conventional materials such as Octamine, Wing-Stay-S, AgeRite Spar and AgeRite Superlite. Satisfactory results can also be obtained using B-L-E.

Other suitable antioxidants are ditertiary butyl hydroquinone alkylated phenols and their sulfides and cresolstyrene condensation products. The amount of antioxidant is usually about 1 to 2 parts per 100 parts of rubber hydrocarbon and 1.25 parts is usually sufficient. Such amount of antioxidant may be contained in an oil masterbatch and may make it unnecessary to add additional antioxidant.

AgeRite Stalite is a general purpose antioxidant made by R. T. Vanderbilt Co., Inc. which is very soluble in alcohol, benzol or gasoline and has a specific gravity of 0.97 to 1.01. It is a mixture of octylated diphenylamines in the form of a viscous reddish-brown liquid.

AgeRite Superlite is an amber liquid mixture of poly butylated bisphenol A which has a specific gravity of about 0.945 to 0.965 and is very soluble in benzol, chloroform and gasoline.

Octamine is a diphenylamine-diisobutylene reaction product made by Naugatuck Chemical Division of United States Rubber Co.

Polygard is tri(nonylated phenyl) phosphite.

Wing-Stay-S is a blend of alkylated phenols made by Goodyear Tire and Rubber Company.

AgeRite Spar is a styrenated phenol made by R. T. Vanderbilt Company. It is a mixture of mono-, di-, and tri-styrenated phenols, such as those having the formula

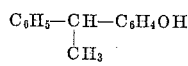

B-L-E is an antioxidant made by Naugatuck Chemical Company consisting of a high temperature reaction product of acetone and diphenylamine. It is a dark-brown viscous liquid having a specific gravity at 20° C. of about 1.09.

Some of the plasticizing oils employed in the rubber compositions of this invention may be replaced by conventional processing aids such as Reogen, a mixture of a high molecular weight oil-soluble sulfonic acid with a paraffin oil, made by R. T. Vanderbilt Company. A peptizer such as Pepton 22 made by American Cyanamid Company may also be employed, but such materials are not necessary to obtain a high quality tire.

Various curing agents may be employed in the rubber compositions of this invention, but highest quality tires are obtained using sulfur as the curing agent and delayed-action accelerators such as MBTS, MBT, Nobs No. 1, Nobs Special, Santocure or the like and/or other conventional materials such as diphenylguanidine (DPG), zinc oxide, etc. The thiazole and guanidine type accelerators are preferred, but advantages of the invention can be obtained using other conventional accelerators.

The materials used in the tread compositions may be generally the same as those of the carcass compositions, but the tread preferably contains little, if any, tackifying resins.

MBTS is a benzothiazyl disulfide.

Captax and MBT are 2-mercaptobenzothiazole.

Santocure is n-cyclohexyl-2-benzothiazole sulfenamide.

Nobs Special is n-oxydiethylene benzothiazole-2-sulfenamide.

Nobs No. 1 is a mixture of 90% by weight of Nobs Special and 10% by weight of MBTS.

The inner liner composition may contain substantial amounts of ingredients such as clays which are undesirable for the rubberized fabric of the carcass and may contain larger amounts of reclaim rubber than are permissible in the carcass composition.

The amounts of curing agents and accelerators in the various plies of the carcass, in the cushion layer composition, and in the inner liner composition are preferably about the same so that the modulus of the various rubber layers is about the same. This is not essential, however.

The rubber compositions of this invention may contain various other ingredients such as accelerator-activators, retarders, etc. An activator such as "Ridacto" may, for example, be used in combination with a primary accelerator such as a thiazole or dithiocarbamate accelerator. Ridacto is an amine reaction product made by Spencer Products Co., Inc. in the form of a liquid having a specific gravity of 1.045 which flows freely at a temperature of 130° to 140° F.

Some of the rubber compositions of this invention may contain minor amounts of reclaim rubber. The reclaim rubber employed is preferably SBR whole-tire reclaim obtained from SBR pneumatic rubber tires having SBR or oil-extended SBR treads. Such whole tire reclaim may, for example, be obtained from used tires of the type made in Example III hereof.

Wherever a recipe for a rubber composition herein calls for sulfur it will be understood that conventional rubbermaker's sulfur is meant unless specifically indicated otherwise.

It will be understood that the term "GR-S" refers to conventional butadiene-styrene rubber and that the term "SBR" has the same meaning. Thus, GR-S 1712 is the same as SBR 1712.

Excellent adhesion is obtained between the various layers of the tire of the present invention since each layer contains a somewhat similar high-Mooney SBR rubber compound. The adhesion is much better than can be obtained using conventional natural rubber cements. Conventional tread cements may be employed to assist in obtaining proper adhesion of the cover layer 23 to the cushion layer 7, but satisfactory adhesion may be obtained merely by applying conventional aliphatic rubber solvents such as gasoline to increase the tackiness of the surfaces.

The curable rubber compositions used in the tire of this invention may be made using standard procedures for mixing in the Banbury mixer. The sulfur and accelerator are preferably added after the other ingredients have been thoroughly mixed and after the temperature has been reduced to a point where the mixing will not affect curing of the rubber. The conventional 2-pass mixing procedure may be followed when the curing agents are mixed in the Banbury or the sulfur and/or accelerators may be mixed on the mill. Various well known mixing procedures may be employed.

After the carcass compound has been thoroughly mixed, it is calendered onto a suitable nylon or rayon tire cord fabric which has previously been treated with or dipped in a suitable adhesive material (such as a vinyl pyridine-butadiene copolymer latex as described in United States Patent No. 2,561,215). The resulting ply fabric is then cut on the bias and thereafter used to form the plies of the tire carcass. It is unnecessary to apply cements or adhesives to the ply fabric in order to obtain the necessary adhesion, but it is desirable to freshen the surfaces by applying a rubber solvent such as naphtha, gasoline or the like to the surfaces of the fabric on the tire building drum or at an earlier time in order to obtain maximum tackiness. The same is true of the cushion layer 7 and the inner layer 6. It is preferable to employ a conventional tread cement at the tread splice, and cements may also be applied to the entire inner surface of the cover layer to provide adhesion between the tread portion thereof and the cushion layer and between the side wall portions and the ply fabric of the carcass, but satisfactory adhesion between the cover layer and the cushion layer may be obtained without the use of adhesives when these two layers are pressed together by calendering.

When it is desired to freshen the surfaces to be adhered, it is customary to employ conventional tire-building solvent which may also be called rubbermaker's solvent. Such solvent may be similar to gasoline. Aliphatic solvents are preferred.

An excellent tread cement composition X may be prepared from a substantially gel-free butadiene-styrene copolymer polymerized at 5° C. and containing about 72% by weight of butadiene and 28% by weight of styrene and having a raw Mooney viscosity of about 125 using the following recipe:

TREAD CEMENT RECIPE

| | Parts by weight |
|---|---|
| Smoked sheet (natural rubber) | 25.0 |
| 125-Mooney polymer (SBR cold rubber) | 75.0 |
| Koresin | 40.0 |
| HAF black (Philblack O) | 60.0 |
| Zinc oxide | 5.0 |
| B-L-E | 1.0 |
| Philrich 5 | 8.5 |
| Distilled pine oil | 1.5 |
| Diphenylguanidine | 0.2 |
| Santocure | 1.1 |
| Sulfur (rubbermaker's) | 2.2 |

Before building of a tire, 219.5 parts by weight of the above cement composition X may be compounded and mixed under the usual 2-pass Banbury mixing procedure and then dissolved in 1245 parts of gasoline to form a tread cement X. Such cement may be employed to adhere the cover layer 23 to the cushion layer 7 and is preferably employed at the tread splice. It may also be employed to adhere the plies and to adhere the cushion layer 7 to the fabric 4, but such use of the cement is unnecessary and therefore undesirable. The rubber compositions of this invention have adequate building tack even when the surfaces are not freshened with conventional tire-builder's solvent (gasoline). It is usually preferable, however, to employ such solvent to the portions of the fabric which are wrapped around the beads. This does not materially increase the cost of building the tire as would be the case if carcass cements had to be used.

The molecular weight or viscosity of an SBR rubber polymer or a rubber composition is preferably measured on a Mooney plastometer. The Mooney plastometer is described in an article entitled "A Shearing Disc Plastometer for Unvulcanized Rubber" by Melvin Mooney, published in Industrial and Engineering Chemistry, Anal. Ed. vol. 6, No. 2, March 1934, p. 147.. The measurement of plasticity or plasticity standards are also described in the "United States Government Specifications for Synthetic Rubbers," July 1945, and "ASTM Standards on Rubber Products," December 1952, pages 488 to 491. The viscosity test using the Mooney plastometer has been given ASTM designation D–924–52T.

Whenever used herein, the terms "Mooney" and "Mooney viscosity" are used to describe the conventional reading on a Mooney plastometer using a large rotor at 4 minutes and a temperature of 212° F. The Mooney viscosity of a polymer is of course greater than that of a composition containing said polymer and a softener or tackifier. As used herein with respect to the curable rubber compositions of this invention, the term "Mooney viscosity" refers to the viscosity of the composition after mixing and before calendering or extrusion. The viscosity of such composition may also be called the "compounded Mooney viscosity."

Natural rubber is known to improve the tackiness of rubber compositions but is not comprehended by the term "Tackifier" or "tackifying resin" as used herein. Process oils and other oily softeners obtained from petroleum tend to soften a rubber composition and make the surface thereof seem more sticky, but it will be understood that oily softeners such as petroleum oils or the like are not considered to be tackifying agents.

The term "fine reinforcing carbon black" is used herein in the limited sense to exclude poor reinforcing blacks such as SRF carbon blacks or the like having a surface area substantially less than 30 square meters per gram.

The cured carcass compositions of this invention have exceptionally low rates of gas diffusion. They are less expensive and provide much more resistance to loss of air from a tubeless tire than SBR rubber compounds presently known as suitable for the inner liners of commercial tubeless tires. Such inexpensive compositions do not have gas permeabilities as low as neoprene or butyl rubber compositions, but they are more desirable than neoprene or butyl compositions for the inner liner of a GR-S rubber tire, particularly because of the ease with which tires can be built and cured without defects due to lack of proper bonding. The inner liners of this invention not only have excellent resistance to air permeation but also have maximum stability under conditions favoring thermal oxidation in service.

The tire industry has long sought effective liners for tubeless tires which were less expensive than butyl rubber inner liners and easier to apply, but the industry has found it necessary to employ the butyl liners because other liners did not protect the carcass against air permeation and prevent the ply separation which occurs as a result of leakage of air into the plies of the tire. Inner liners are extremely important since they must be very thin to facilitate cooling of the tire and also very effective to prevent gas diffusion into the tire fabric.

A conventional SBR cold rubber polymer such as that of GR-S 1500 or GR-S 1712 comprises a substantially gel-free copolymer of 75.5 to 77.5% butadiene and 224.5 to 22.5% styrene. It contains roughly 1.25% by weight of an antioxidant such as Polygard and is polymerized at about 5° C. using a sugar-free iron-pyrophosphate recipe. A dithiocarbamate short-stop and salt-acid coagulation are employed. The butadiene-styrene (SBR) copolymer of GR-S 1500 has a raw Mooney viscosity of about 50 to 60, whereas the butadiene-styrene copolymer of GR-S 1712 has a raw Mooney viscosity of about 120 to 125.

In the following examples standard SBR cold rubbers are employed. The butadiene-styrene polymer of an SBR–1778 oil masterbatch is substantially the same as that of standard GR-S 1712 oil masterbatch.

It will be understood that "GR-S 1712 polymer" is used herein to define a 125-Mooney copolymer such as that of a GR-S 1712 oil masterbatch or an SBR–1778 oil masterbatch.

The SBR–1778 oil masterbatch of the following examples consists of 100 parts by weight of the 125-Mooney SBR copolymer, 37.5 parts by weight of Circosol 2XH, and 1.25 parts by weight of a tris-nonylphenylphosphite-type antioxidant, such as "Polygard." Such oil masterbatch has a raw Mooney viscosity of about 50 to 55.

*Example I*

An inner liner composition A is prepared from natural rubber, whole tire reclaim (oil-extended SBR cold rubber), and an SBR 1778 oil masterbatch having a raw Mooney viscosity of about 53 according to the following recipe:

INNER LINER RECIPE

| | Parts by weight |
|---|---|
| SBR 1778 oil masterbatch | 51.6 |
| Natural rubber (Hevea) | 40.0 |
| Whole tire reclaim | 45.0 |
| EPC carbon black | 34.0 |
| Dixie clay | 22.0 |
| Zinc oxide | 3.4 |
| Stearic acid | 2.2 |
| Picco 100 | 3.4 |
| Vultac 2 (23% sulfur)[1] | 2.2 |
| Agerite Stalite | 1.1 |
| Circosol 2XH | 3.0 |
| Nobs No. 1 | 1.1 |
| Ridacto | 0.8 |
| Insoluble sulfur 60 (60% insoluble, 40% soluble) | 2.2 |

[1] Alkyl phenol disulfide made by Pennsalt Chemicals Corp.

The above materials are compounded and mixed under the usual 2-pass Banbury mixing procedure and are calendered to provide an incured inner liner sheet A having a substantially uniform thickness of about 0.08 inch for use in building a tire. Another sheet of uniform thickness is formed from such material for testing, and such sheet is cured at a temperature of 287° F. for about 45 minutes to the elastic state to provide test samples A having a uniform thickness of about 0.070 inch.

*Example II*

An inner liner composition B is prepared from an SBR 1778 oil masterbatch and from a substantially gel-free SBR copolymer formed by polymerizing at 5° C. a mixture of about 72% by weight of butadiene and about 28% by weight of styrene and having a Mooney viscosity of about 125 using the following recipe:

INNER LINER RECIPE

|  | Parts by weight |
|---|---|
| SBR 1778 oil masterbatch | 91.5 |
| 125-Mooney SBR polymer | 33.3 |
| Picco 100 | 25.0 |
| HAF black (Philblack-O) | 31.0 |
| MAF black (Philblack-A) | 31.0 |
| Zinc oxide | 3.0 |
| Stearic acid | 2.0 |
| Pepton 22 [1] | 0.5 |
| Antioxidant (Agerite Spar) | 1.0 |
| Butac | 7.0 |
| Santocure | 1.5 |
| Diphenylguanidine | 0.6 |
| Rubbermaker's sulfur | 2.3 |

[1] 2,2'-dibenzamido diphenyl disulfide, a peptizer made by American Cyanamid Co., is not essential and may be omitted.

The above materials are compounded and mixed under the usual 2-pass Banbury mixing procedure and are calendered to provide an uncured inner liner sheet B with a uniform thickness of about 0.06 inch for use in building a tire. A sheet of this material is calendered and cured for about 45 minutes at 287° F. to the elastic state and cut to provide test samples B having a uniform thickness of 0.050 inch.

The cured test samples A and B are employed as a membrane in a conventional permeability testing apparatus that measures the amount of gas passing through such membrane when it is subjected to a gas pressure differential. The apparatus consists of a gas supply, a permeability cell, means for maintaining a constant temperature, and a McLeod gage for measuring the quantity of gas. The permeability cell contains a porous supporting member for the membrane, and means are provided for obtaining a vacuum on one side of the sample membrane to hold it against such porous supporting member, the edges of the sample being sealed to prevent gas flow.

It is found that the cured samples B of this example are much less permeable than the cured samples A of Example I, the total amount of gas passing through each sample B per unit of time being less than the amount passing through each of the thicker samples A.

*Example III*

An oil-extended rubber tread composition C is prepared from low Mooney SBR rubber and from an SBR–1712 oil masterbatch having a Mooney viscosity of about 53 using the following recipe:

OIL-EXTENDED GRS TREAD RECIPE

|  | Parts by weight |
|---|---|
| SBR-1712 oil masterbatch | 68.8 |
| 50–60 Mooney polymer (SBR cold rubber) | 50.0 |
| HAF carbon black (Philblack-O) | 55.0 |
| Zinc oxide | 3.0 |
| Stearic acid | 2.0 |
| Antioxidant (Stabilitie)[1] | 0.5 |
| Antioxidant (B-L-E) | 0.5 |
| Antiozidant (Santoflex AW)[2] | 1.5 |
| Processing oil (Philrich 5) | 4.0 |
| Paraffin wax | 3.0 |
| Accelerator (Santocure) | 1.1 |
| Rubbermaker's sulfur | 2.0 |

[1] Stabilite is diphenyl ethylene diamine.
[2] Santoflex AW is 6-ethoxy-1,2-dihydro-2,2,4-trimethylquinoline.

The above materials are compounded and mixed under the usual 2-pass Banbury mixing procedure to provide a curable tread composition C having a Mooney viscosity of about 55 to 65 and is then extruded to the conventional shape to provide a cover layer including the tread and side wall portions of the tire, the Mooney viscosity of the extruded cover layer being about 50 to 55.

A cushion layer composition D is prepared from the 50–60 Mooney cold rubber SBR polymer employed above and from natural rubber using the following recipe:

CUSHION RECIPE

|  | Parts by Weight |
|---|---|
| Natural rubber (Hevea) | 50.0 |
| 50–60 Mooney polymer (SBR cold rubber) | 50.0 |
| HAF carbon black (Philblack 0) | 35.0 |
| Zinc oxide | 3.0 |
| Stearic acid | 2.0 |
| Antioxidant (B-L-E) | 2.0 |
| Process oil (Philrich 5) | 2.0 |
| Tackifying resin (Picco 100) | 3.0 |
| Accelerator (Nobs No. 1) | 0.9 |
| Accelerator-Activator (Ridacto) | 0.5 |
| Rubbermaker's sulfur | 2.6 |

The above materials are compounded and mixed under the usual 2-pass Banbury mixing procedure and calendered to provide a cushion sheet with a thickness of about 0.02 inch. The resulting cushion layer is then calendered against the extruded cover layer formed above to adhere the cushion layer to the flat side of the extruded cover layer. A conventional natural rubber tread cement or the tread cement X described above may be employed to adhere the cushion sheet to the cover layer but this is not essential.

A carcass composition E is prepared from an SBR 1778 oil masterbatch and additional high Mooney polymer using the following recipe:

CARCASS RECIPE

|  | Parts by Weight |
|---|---|
| SBR 1778 | 62.3 |
| 125-Mooney SBR polymer (cold rubber) | 54.7 |
| Picco 100 | 40.0 |
| HAF black (Philblack 0) | 31.0 |
| MAF black (Philblack A) | 31.0 |
| Zinc oxide | 3.0 |
| Stearic acid | 2.0 |
| Antioxidant (Agerite Spar) | 1.0 |
| Butac | 5.0 |
| Santocure | 1.5 |
| Diphenylguanidine | 0.6 |
| Rubbermaker's sulfur | 2.3 |

The above materials are compounded and mixed under the usual 2-pass Banbury mixing procedure and are applied to conventional weak-weft nylon fabric by the usual calendering operation to provide a rubberized-fabric ply stock. Before calendering, the Mooney viscosity of the carcass composition E is about 32 to 40.

A vulcanizable inner liner sheet B, prepared from the composition B as indicated in Example II and having a thickness of about 0.06 inch, is applied to the conventional tire building drum shown in FIGURE 2 and centrally located thereon. A first ply of bias-cut rubberized fabric ply stock, as prepared above from the carcass composition E, is then applied to said tire building drum so that the end portions thereof project beyond the ends of the drum. Said end portions only are preferably freshened by wetting the outer surface with conventional tire-builder's solvent, and another ply of the same rubberized fabric is applied in a similar manner with the end edges offset from the end edges of the previous ply. The operation is repeated, rotating the drum in a different direction when applying each ply as is the usual practice in building tires, until four plies are applied to the drum, the end portions only of each ply being freshened with solvent. After the four plies have been applied to the drum with their end edges offset, bead rings are located at the opposite shoulders of the drum, and the end portions of the fabric are turned over said bead rings by the use of annular garter springs generally as disclosed in United States Patent No. 2,838,091, said end portions being pressed radially inwardly against the underlying fabric layers on the drum by the garter springs.

Thereafter the extruded cover layer 23 (tread and side wall portions) with the cushion layer 7 adhered thereto as prepared above, is applied to the 4-ply carcass on the drum D as shown in FIG. 2, the cushion layer being adhered to the outer ply. The bias cut end portions of the cover layer 23 are covered with the tread cement X described above a short time before such surfaces are joined to provide the tread splice so as to provide a strong adhesive layer at said splice. The cover layer 23 is spliced and is stitched to the carcass in the conventional manner by external pressure as disclosed in said Patent No. 2,838,091 to provide a generally cylindrical vulcanizable tire on the tire building drum D as shown in FIGURE 2.

The tire building drum D is then contracted and the tire is removed from the drum. The tire is then placed in a conventional "Bag-o-matic" curing mold wherein it is vulcanized in the conventional manner while in the toric shape shown in FIGURE 1 for about 20 minutes at 330° to 340° F.

The resulting 7:50–14 tubeless tire has a cross section substantially as shown in FIGURE 1, the inner liner 6 having a thickness greater than 0.030 inch and the cushion layer 7 having a thickness greater than 0.010 inch. Tubeless tires made in this manner are mounted on a standard automobile and driven at high speeds until the centers of the tread are almost smooth. The tubeless tires are then removed from the wheels and inspected for defects (i.e., tread or ply separation, cracking, etc.). Such tires have been found to provide excellent service in a cold climate. Such tires used in Minnesota during the winter of late 1960 and early 1961 have been inspected after many thousands of miles of normal use and found to be free of cracks on the inner surface even though the carcass and inner liner employed large amounts of resin which were previously thought to cause cracking at low temperatures.

Four of such tires were mounted on one automobile and driven at 75 miles per hour for about 14,625 miles, but there was no evidence of cracking, tread separation, ply separation, or other defects after such harsh treatment. Four of such tires were mounted on another automobile and driven at about 75 miles per hour for about 18,000 miles, and again there were no noticeable defects. These tests demonstrated that such tubeless tires performed exceptionally well when driven at high speeds. The carcass of each of the tires was found to have excellent resistance to loss of air by gas diffusion therethrough, even though such carcass and the inner liner thereof were relatively thin. Such carcass is also found to have greatly improved resistance to cracking and degradation due to flexing, oxidation and ozonization and to have the other properties required in modern high quality passenger car tires.

*Example IV*

A 7:50–14 tubless pneumatic rubber tire is built and vulcanized using the same materials and following the same procedure as set forth in Example III except that the inner liner sheet prepared from the composition B of Example II is replaced by the thicker inner liner sheet A of Example I. A reliable high quality high speed tire is thus produced which has all the desirable properties neeed in a modern passenger car tire including a long useful life, the ability to hold air, the ability to resist heat buildup, ply separation, etc. The cured inner liner of such tire does not hold air in the tire any better than thinner inner liner of Example III, even though it is more than 20% thicker, and has a much shorter useful life since it has less resistance to heat buildup, degradation and cracking. It is however, at least as good as the conventional SBR iner liner compositions used in modern passenger car tires prior to this invention and adheres well to the carcass. The tire of this Example IV is well suited for high speed driving like the tire of Example III and is capable of operation for 30,000 miles or more without tire failure under severe operating conditions.

*Example V*

A 7:50–14 tubeless tire is built and vulcanized using the same materials and following the same procedures as in Example III except that the carcass composition E was replaced by the following carcass composition F:

CARCASS RECIPE

| | Parts by weight |
|---|---|
| 125-Mooney polymer (GR-S cold rubber) | 100.0 |
| HAF black (Philblack O) | 62.0 |
| Picco 100 | 40.0 |
| Reogen [1] | 5.0 |
| Zinc oxide | 3.0 |
| Stearic acid | 2.0 |
| Agerite Spar | 1.0 |
| Pepton 22 (optional) | 0.5 |
| Santocure | 1.5 |
| Diphenylguanidine | 0.6 |
| Rubbermaker's sulfur | 2.3 |

[1] Reogen is a mixture of a high molecular weight oil-soluble sulfonic acid with a paraffin oil and is used as a process aid. It may be replaced with 5 parts by weight of Circosol 2XH without substantially changing the results.

The above carcass composition is used on all four plies, the surfaces of the plies being freshened with conventional tire-builder's solvent during building of the tire to improve tackiness. A very high qaulity tire is produced which is capable of operating 30,000 miles or more without tread or ply separation and which has exceptional resistance to heat aging and heat buildup.

*Example VI*

A 7:50–14 tubeless tire is built and vulcanized using the same materials and the same procedure as in Example III except that the carcass composition E is replaced by the following carcass composition G:

CARCASS RECIPE

| | Parts by weight |
|---|---|
| 125-Mooney polymer (SBR cold rubber) | 90.0 |
| Natural rubber (Hevea) | 10.0 |
| Picco 100 | 35.0 |
| Circosol 2XH | 17.0 |
| HAF black | 31.0 |
| MAF black | 31.0 |
| Zinc oxide | 3.0 |
| Stearic acid | 2.0 |
| Agerite Spar | 1.5 |
| Butac | 5.0 |
| Santocure | 1.5 |
| Diphenylguanidine | 0.6 |
| Sulfur | 2.3 |

The resulting tire is found to have the same high quality as the tires of Examples III and V, there being no improvement resulting from the use of natural rubber. The natural rubber does not facilitate building of the tire and adds nothing to the quality of the tire.

*Example VII*

A tubeless all-synthetic GR–S rubber tire is built on a tire building drum and vulcanized using the same materials and following the same procedure as in Example III except that the composition D employed to form the cushion layer 7 is replaced by the composition E of Example III, a tread cement composition J is employed to adhere the cushion layer to the tread, and the tread composition C is replaced by a tread composition H, prepare from a substantially gel-free butadiene-styrene copolymer polymerized at 5° C. and containing about 72% by weight of butadiene and 28% by weight of styrene and having a low Mooney viscosity of 50, using the following recipe:

TREAD RECIPE

| | Parts by weight |
|---|---|
| 50-Mooney polymer (GR–S cold rubber) | 100.0 |
| HAF carbon black (Philblack O) | 50.0 |
| Petroleum softener (Sundex 53) | 8.0 |
| Zinc oxide | 3.0 |
| Stearic acid | 1.0 |
| Santocure | 1.0 |
| Rubbermaker's sulfur | 1.75 |

The tread cement composition J is prepared according to the following recipe:

TREAD CEMENT RECIPE

| | Parts by weight |
|---|---|
| 145-Mooney polymer (GR–S cold rubber) | 100.0 |
| Koresin | 40.0 |
| HAF black | 60.0 |
| Zinc oxide | 5.0 |
| B–L–E | 1.0 |
| Philrich 5 | 10.0 |
| Diphenylguanidine | 0.3 |
| Santocure | 1.2 |
| Rubbermaker's sulfur | 2.2 |

After the above materials have been thoroughly mixed by the usual 2-pass Banbury mixing procedure, 219.7 parts of the resulting curable rubber composition J is dissolved in 1100 parts of gasoline to provide a tread cement. In building the tire according to the procedure of Example III such tread cement is applied at the tread splice and between the tread and the cushion layer in the conventional manner. No cements are employed elsewhere during the building of the tire on the tire building drum and no solvents are employed to freshen the surfaces except in the vicinity of the tire beads.

The cured all-synthetic tire of this Example VII is easy to make and has the exceptional high quality of the tires of Example III. It is capable of operating 30,000 miles or more without tread or ply separation and is particularly well suited for high speed driving. The low Mooney tread is more expensive than the tread of the tires of Example III and has poorer wearing qualities.

*Example VIII*

A 7:50–14 pneumatic rubber tire is built and vulcanized using the same materials and following the same procedure as set forth in Example III, except that the cushion layer composition D is replaced by a cushion layer composition K prepared from an SBR–1778 oil masterbatch having a Mooney viscosity of about 53 and from more of the same 125-Mooney polymer using the following recipe:

CUSHION RECIPE

| | Parts by weight |
|---|---|
| SBR–1778 oil masterbatch | 47.6 |
| 125-Mooney polymer (SBR cold rubber) | 65.4 |
| Picco 100 | 40.0 |
| HAF black | 31.0 |
| MAF black | 31.0 |
| Zinc oxide | 3.0 |
| Stearic acid | 2.0 |
| Antioxidant (Agerite Spar) | 1.0 |
| Butac | 5.0 |
| Pine oil | 5.0 |
| Santocure | 1.5 |
| Diphenylguanidine | 0.6 |
| Rubbermaker's sulfur | 2.3 |

The above ingredients are mixed to provide a curable rubber composition similar to the carcass composition E and is calendered to provide a homogeneous cushion sheet with a uniform thickness of about 0.02 inch which is adhered to the extruded cover layer 23 without the use of any adhesive, the surfaces of the cover layer and the cushion sheet being freshened with rubbermaker's solvent before being joined. After curing, the tubeless rubber tire of this example has the excellent properties of the tire of Example III and is capable of operating at high speeds without tread or ply separation. The tread has much better wearing qualities than the tread of Example VII.

*Example IX*

A 7:50–14 tubeless pneumatic rubber tire is built using the same materials and the same procedures set forth in Example III, except that the carcass composition E is replaced by a carcass composition having the following recipe:

CARCASS RECIPE

| | Parts by weight |
|---|---|
| SBR–1778 oil masterbatch | 34.3 |
| 125-Mooney polymer (SBR cold rubber) | 54.7 |
| Whole tire reclaim (100% SBR) | 40.0 |
| Picco 100 | 35.0 |
| HAF (Philblack O) | 25.0 |
| MAF (Philblack A) | 31.0 |
| Zinc oxide | 3.0 |
| Stearic acid | 2.0 |
| Antioxidant (Agerite Spar) | 1.0 |
| Butac | 5.0 |
| Pine oil | 6.0 |
| Circosol 2XH | 10.0 |
| Santocure | 1.5 |
| Diphenylguanidine | 0.6 |
| Rubbermaker's sulfur | 2.3 |

After curing in the mold, the tire of this Example IX has excellent properties comparable to those of the tires of Example III including improved resistance to loss of air by gas permeation and the ability to operate in the neighborhood of 30,000 miles without tread or ply separation so as to justify commercial manufacture of such a tire, but the reclaim rubber reduces the quality of the tire substantially as compared with the tire of Example III.

As much as 50 parts of reclaim rubber may be mixed with 50 parts of high Mooney SBR polymers in the rubber compositions of this invention, but the quality of the tire decreases as the amount of reclaim rubber is increased, and it is usually preferable to employ no more than 25 parts of whole tire reclaim rubber per 100 parts of unused SBR rubber polymers in high quality tires.

The tires of the above examples are very durable and will last for a long period of time without tread or ply separation. Such tires are capable of operation more than 30,000 miles under severe conditions of use without failure. Tires having comparable ability to operate safely at high speeds to resist heat degradation and to resist gas diffusion cannot be made from rubber compositions containing large proportions of natural rubber as in the commercial passenger car tires made prior to this invention.

Unless the context shows otherwise, and wherever used in the specification or claims, the term "parts" means parts by weight, the term "high Mooney" means a raw Mooney viscosity of at least 100, the term "SBR" means a copolymer of about 60 to 90% butadiene and about 10 to 40% styrene, and all percentages mentioned are percentages by weight. Wherever used in this application the term "Mooney viscosity" or "ML/212–4" means the Mooney viscosity of a raw uncompounded polymer or a mixed rubber composition (before extrusion or calendering) read after 4 minutes operation of the large rotor of a Mooney Shearing Disc Viscosimeter at 212° F. (100° C.).

The expression "parts phr." means the number of parts by weight of the compounding ingredients per 100 parts by weight of rubber hydrocarbons or polymers and will, of course, be assumed if reference is made to the number of parts without reference to the number of parts of rubber hydrocarbons.

In the above examples the 125-Mooney polymer may be the same as the polymer of an SBR–1778 oil masterbatch.

It will be understood that the above description is by way of illustration rather than limitation and that, in accordance with the provisions of the patent statutes, variations and modifications of the specific methods, articles and compositions described herein may be made without departing from the spirit of the invention.

Having described my invention, I claim:

1. In a pneumatic rubber tire having a tread formed of a butadiene-styrene rubber composition, the improvement which comprises a carcass having tire cords embedded in at least one layer of substantial thickness formed of a butadiene-styrene carcass composition, said carcass composition in the uncured state having a raw Mooney viscosity of about 30 to 50 and consisting essentially of 100 parts by weight of butadiene-styrene copolymers having a Mooney viscosity of M, M being about 120 to 180, Y parts of compatible resins that are tackifiers for rubber that are soluble in benzene and that have a melting point of about 60° to 100° C., Y being about $(M/3-5)$ to $(M/2-10)$, about $0.3(100+Y)$ to $0.6(100+Y)$ parts of carbon black, about 10 to $(Y/2+5)$ parts of compatible plasticizing oils, and up to 20 parts of other compounding ingredients including a vulcanizing agent and an accelerator, said carcass composition containing at least 40 parts of said compatible resins per 100 parts of butadiene-styrene rubber polymers.

2. A tire as defined in claim 1 wherein at least about three-fourths of said plasticizing oils are naphthenic and paraffinic oils and said tackifying resins consist predominantly of coumarone-indene resins.

3. A tire as defined in claim 1 wherein a major portion of said tackifying resins are soluble in the plasticizing oils and a major portion of said oils are hydrocarbon oils having a Saybolt viscosity at 100° F. of at least 100 seconds and a Saybolt viscosity at 210° F. of no more than 100 seconds.

4. In a pneumatic rubber tire having an abrasion-resistant tread formed of a vulcanizable tread composition consisting essentially of 100 parts by weight of a rubber synthetic hydrocarbon polymerization product of 60 to 90 percent butadiene and 40 to 10 percent styrene having a raw Mooney viscosity of at least 110, 0 to 10 parts by weight of resins that are tackifiers for rubber, at least 20 parts by weight of compatible plasticizing oils, an amount of carbon black equal to 0.3 to 0.7 times the sum of said rubber hydrocarbon polymers, said tackifiers and said plasticizers, and up to 30 parts of other compounding ingredients including a vulcanizing agent and an accelerator, said vulcanizable tread composition having a raw Mooney viscosity of about 40 to 80, the improvement which comprises a multiple-ply fabric-reinforced carcass having tire cords embedded in a carcass composition consisting essentially of 0 to 15 parts by weight of natural rubber and 100 parts by weight of a rubbery hydrocarbon polymerization product of 60 to 90 percent butadiene and 40 to 10 percent styrene having a raw Mooney viscosity of M, M being about 120 to 180, Y parts of compatible tackifying resins consisting predominantly of coumarone-indene resins having a melting point of 60 to 100° C., Y being at least 40 and between $(M/3-5)$ and $(M/2-10)$, about $0.35(100+Y)$ to $0.5(100+Y)$ parts of carbon black, 10 to $(Y/2+5)$ parts of compatible plasticizing oils sufficient to reduce the raw Mooney viscosity of said carcass composition to about 30 to 50, and up to 30 parts of other compounding ingredients including a vulcanizing agent and an accelerator.

5. A tire as defined in claim 4 wherein said tread composition provides a tensile strength of at least 2500 pounds per square inch and contains 0 to 10 parts of natural rubber and 0 to 20 parts of reclaim rubber per 100 parts of said first-named polymerization product and said carcass composition provides a tensile strength of at least 2000 pounds per square inch and contains at least $M/3$ parts of coumarone-indene resins, 0 to 10 parts of natural rubber, and 0 to 20 parts of reclaim rubber per 100 parts by weight of said last-named polymerization product.

6. A pneumatic rubber tire having a fabric-reinforced carcass built by the "flat-band" process and a tread surrounding said carcass, said carcass having tire cords embedded in a carcass composition consisting essentially of 100 parts by weight of a rubbery synthetic hydrocarbon polymerization product of a conjugated diolefinic compound of 4 to 5 carbon atoms, said polymerization product having a raw Mooney viscosity of about 120 to 180, up to 30 parts by weight of compatible plasticizing oils, about 40 to 60 parts by weight of resins with a melting point of about 60° to 100° C. that are tackifiers for rubber and that are soluble in pure benzene and compatible with said polymerization product, about 40 to 100 parts by weight of carbon black, and no more than 15 parts by weight of other compounding ingredients, said carcass composition in the uncured state having a Mooney viscosity of about 30 to 50, the amount by weight of said tackifying resins being at least twice the amount of said plasticizing oils.

7. A tire as defined in claim 5 wherein said polymerization product is a copolymer of 70 to 90 percent by weight of butadiene and 30 to 10 percent by weight of styrene having a Mooney viscosity of about 120 to 160, said tread consisting essentially of 100 parts by weight of a copolymer of 70 to 90 percent by weight of butadiene and 30 to 10 percent by weight of a styrene, said copolymer having a Mooney viscosity of about 120 to 200, and 20 to 60 parts by weight of a compatible plasticizing oil, at least about 90 percent of the tackifying resins in said tire being present in said carcass composition and being soluble in said first-named plasticizing oils.

8. A toric-shaped pneumatic rubber tire having a fabric-reinforced multiple-ply carcass and a tread surrounding said carcass, said tread being formed of a tread composition consisting essentially of 100 parts by weight of a rubbery synthetic hydrocarbon butadiene-styrene polymerization product, X parts of a compatible plasticizer oil, and about $0.3(100+X)$ to $0.7(100+X)$ parts by weight of reinforcing carbon black, X being an amount of said oil which when mixed with 100 parts of said polymerization product in the raw state and with $\frac{1}{2}(100+X)$ parts of a high abrasion furnace carbon black having a surface area of 79 square meters per gram provides an unvulcanized composition with a raw Mooney viscosity of about 40 to 80, said polymerization product having a raw Mooney viscosity of about 120 to 200 and comprising the principal rubber polymer of said carcass, the tire cords of said carcass being embedded in a resin-containing rubber composition consisting essentially of (a) 100 parts by weight of a rubbery synthetic hydrocarbon polymerization product of said diolefinic compound having a raw Mooney viscosity of M, M being about 120 to 180, (b) Y parts of a compatible resin with a melting point of about 60° to 100° C. that is a tackifier for rubber and is soluble in pure benzene, Y being at least 40 and no more than $(M/2-10)$, (c) at least 40 and no more than $0.6(100+Y)$ parts of reinforcing carbon black, and (d) at least 10 parts of plasticizing oil sufficient to reduce the Mooney viscosity of said last-named composition to about 30 to 60.

9. In a toric-shaped tubeless pneumatic rubber tire having a carcass and tread formed of a high-Mooney butadiene-styrene rubber composition, the improvement which comprises a toric-shaped inner liner covering the inner surface of the tire plies and extending between the bead portions of the tire to prevent leakage of air through said carcass, said inner liner being formed of a rubber composition consisting essentially of 100 parts by weight of a butadiene-styrene copolymer having a raw Mooney viscosity of M, M being about 120 to 180, 0 to 30 parts of reclaim rubber, 0 to 10 parts of natural rubber, at least 30 and no more than $(M/2-10)$ parts of compatible oil-soluble resins that are tackifiers for rubber, 50 to 100 parts of carbon black, and an amount of compatible plasticizing oils sufficient to reduce the Mooney viscosity of said rubber composition to about 30 to 60.

10. In a toric-shaped tubeless pneumatic rubber tire having a tread formed of a butadiene-styrene rubber composition, a carcass comprising an inner liner and a plurality of plies of rubberized fabric comprising synthetic fiber cords covered with a carcass composition, said carcass composition in the uncured state consisting essentially of 100 parts by weight of a substantially gel-free butadiene-styrene copolymer having a Mooney viscosity of M, M being about 120 to 180, $(M/3-5)$ to $(M/2-10)$ parts of compatible oil-soluble resins having a melting point of about 60 to 100° C., that are tackifiers for rubber, 40 to 100 parts of fine reinforcing carbon black, 0 to 15 parts of natural rubber, and at least 10 parts of a compatible plasticizing oil which is a solvent for said resins, said carcass composition having a raw Mooney viscosity of about 30 to 50, said inner liner being substantially free of fabric reinforcement and comprising a substantially homogeneous layer with a thickness of about 0.03 to 0.1 inch bonded to the inner ply and covering the inside of the tire to prevent leakage of air therefrom, said last-named layer consisting essentially of 100 parts by weight of a butadiene-styrene copolymer having a Mooney viscosity of about 120 to 180, 25 to 60 parts of a compatible resin that is a tackifier for rubber, about 50 to 100 parts of carbon black, 0 to 10 parts of natural rubber, 0 to 40 parts of reclaim rubber, and at least 5 parts of compatible plasticizing oils sufficient to reduce the Mooney viscosity of the rubber composition to about 30 to 70.

11. A pneumatic rubber tire having a multiple-ply fabric-reinforced carcass, a homogeneous cushion layer with a thickness of about 0.01 to 0.05 inch surrounding and bonded to said carcass, and a homogeneous road-engaging abrasion-resistant tread layer bonded to the outer portion of said cushion layer, characterized in that each ply of said carcass contains synthetic fiber cords embedded in a carcass composition consisting essentially of 100 parts by weight of a substantially gel-free butadiene-styrene copolymer having a Mooney viscosity of M, M being about 120 to 180, $(M/2-5)$ to $(M/2-10)$ parts of compatible resins having a melting point of at least 60° C. that are tackifiers for rubber, 0.3 $(100+Y)$ to 0.6 $(100+Y)$ parts of fine reinforcing carbon black, Y being the amount of said resins, 0 to 15 parts of natural rubber, 0 to 20 parts of reclaim rubber, and at least 10 parts of a compatible plasticizing oil sufficient to reduce the raw Mooney viscosity of said carcass composition to about 30 to 50, said cushion layer being formed of a cushion composition consisting essentially of 100 parts by weight of a substantially gel-free butadiene-styrene copolymer having a Mooney viscosity of M, M being about 120 to 180, Y parts of compatible oil-soluble resins that are tackifiers for rubber, Y being about $(M/3-5)$ to $(M/2-10)$ parts by weight, about 0.3 $(100+Y)$ to 0.6 $(100+Y)$ parts of carbon black, 0 to 20 parts of natural rubber, 0 to 10 parts of reclaim rubber, and at least 10 parts of a compatible plasticizing oil sufficient to reduce the raw Mooney viscosity of said cushion composition to about 30 to 65.

12. In a pneumatic rubber tire having a tread formed of a butadiene-styrene rubber composition, the improvement which comprises a carcass having the tire cords embedded in at least one layer of substantial thickness formed of a butadiene-styrene carcass composition, said carcass composition in the uncured state having a raw Mooney viscosity of about 30 to 50 and consisting essentially of rubber hydrocarbon polymers including 100 parts by weight of a butadiene-styrene polymerization product having a Mooney viscosity of M, M being about 120 to 180, Y parts of compatible resins that are tackifiers for rubber, that are soluble in benzene and that have a melting point of about 60° to 100° C., Y being about $(M/3-5)$ to $(M/2-10)$, about 0.3 $(100+Y)$ to 0.6 $(100+Y)$ parts of carbon black, and about 10 to $(Y/2+5)$ parts of compatible plasticizing oils comprising at least 90 percent by weight of naphthenic and paraffinic oils, said resins being soluble in aliphatic solvents and compatible with said oils.

13. A pneumatic rubber as defined in claim 8 wherein at least one layer of said carcass has tire cords embedded in a vulcanizable rubber composition composed essentially of 100 parts by weight of butadiene-styrene polymers having an average Mooney viscosity of M, M being about 120 to 180, Y parts of coumarone-indene tackifying resins having a melting point of about 60° to 100° C., Y being about $(M/3-5)$ to $(M/2-10)$, about 0.3 $(100+Y)$ to 0.6 $(100+Y)$ parts of fine reinforcing furnace carbon black about 10 to $(Y/2+5)$ parts of compatible plasticizing oils sufficient to reduce the raw Mooney viscosity of the vulcanizable rubber composition to about 30 to 60, 0 to 10 parts of natural rubber, and up to 15 parts of conventional compounding ingredients including about 2 to 8 parts of zinc oxide, about 0.5 to 3 parts of stearic acid, about 0.5 to 2 parts of an antioxidant, about 0.5 to 3 parts of accelerators, and about 1.5 to 3 parts of sulfur, at least about three-fourths of said plasticizing oils being naphthenic and paraffinic oils and up to one-fourth of said plasticizing oils being aromatic oils.

14. In a process of forming a fabric reinforced sheet of a curable rubber carcass composition wherein said sheet is passed between cylindrical metal rolls of a calender, the improvement which comprises the steps of polymerizing a mixture of 70 to 90 percent of weight of butadiene and 30 to 10 percent by weight of styrene at a temperature of about 0° to 10° C. to produce a rubbery polymerization product having a raw Mooney viscosity of about 120 to 180, mixing 100 parts by weight of said polymerization product with 40 to 60 parts of compatible oil-soluble resins that are tackifiers for rubber and which provide a mixture of such amounts of polymerization product and resins with a raw Mooney viscosity of about 45 to 65, and mixing with said polymerization product and said resins 40 to 90 parts of fine reinforcing furnace carbon black and up to 15 parts of conventional compounding ingredients including zinc oxide, stearic acid, an antioxidant, an accelerator and sulfur to produce a reinforced rubber composition with will vulcanize at a temperature of about 140 to 150° C., adding at least 10 parts of compatible plasticizing oils to reduce the raw Mooney viscosity of the vulcanizable mixture to about 30 to 45, calendering the resulting curable rubber composition to form a rubberized ply fabric having tire cords embedded in said rubber composition, said resins having a melting point of about 60° to 100° C. and providing the rubber composition with building tack without causing the material to stick to the metal rolls of the calender.

15. A ply fabric having fiber cords embedded in a carcass composition which, in the uncured state, has a raw Mooney viscosity of about 30 to 50, said composition consisting essentially of 100 parts by weight of a butadiene-syrene polymerization product having a Mooney viscosity of M, M being about 120 to 180, Y parts of compatible resins that are tackifiers for rubber, that are soluble in benzene and that have a melting point of about 60° to 100° C., Y being about $(M/3-5)$ to $(M/2-10)$, about 0.3 $(100+Y)$ to 0.6 $(100+Y)$ parts of carbon black, and about 10 to $(Y/2+5)$ parts of compatible plasticizing oils comprising at least 90 percent by weight of naphthenic and paraffinic oils, said resins being soluble in aliphatic solvents and compatible with said oils.

References Cited by the Examiner

UNITED STATES PATENTS

| | | | |
|---|---|---|---|
| 2,625,981 | 1/1953 | Wallace | 156—128 |
| 2,776,693 | 1/1957 | Ferrin | 152—330 |
| 2,881,096 | 4/1959 | Kisbany | 260—33.6 |
| 2,884,044 | 4/1959 | Hulswit et al. | 156—128 |
| 2,905,220 | 9/1959 | Schutz | 260—33.6 |
| 2,964,083 | 12/1960 | Pfau et al. | 152—330 |
| 3,048,509 | 8/1962 | Sweet et al. | 260—33.6 |

FOREIGN PATENTS 857,397  12/1960  Great Britain.

MORRIS LIEBMAN, *Primary Examiner.*

ARTHUR L. LA POINT, *Examiner.*